US007012164B2

(12) United States Patent
Yamada et al.

(10) Patent No.: US 7,012,164 B2
(45) Date of Patent: Mar. 14, 2006

(54) METHOD FOR CONTINUOUSLY PRODUCING A POLYETHER

(75) Inventors: Kazuhiko Yamada, Kanagawa (JP); Nobuyuki Kasahara, Kanagawa (JP); Yoshinori Toyota, Kanagawa (JP); Chitoshi Suzuki, Ibaraki (JP); Shigeru Ikai, Ibaraki (JP); Hiroshi Hatano, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 10/895,063

(22) Filed: Jul. 21, 2004

(65) Prior Publication Data

US 2004/0260056 A1    Dec. 23, 2004

Related U.S. Application Data

(63) Continuation of application No. PCT/JP03/00549, filed on Jan. 22, 2003.

(30) Foreign Application Priority Data

Jan. 22, 2002    (JP)    ............................. 2002-012761

(51) Int. Cl.
C08G 65/28    (2006.01)

(52) U.S. Cl. ...................................... 568/620; 568/618
(58) Field of Classification Search ................ 568/620, 568/618
See application file for complete search history.

(56) References Cited

U.S. PATENT DOCUMENTS

| | | | |
|---|---|---|---|
| 3,404,109 A | 10/1968 | Milgrom | 568/607 |
| 5,290,912 A | 3/1994 | Watabe et al. | 528/405 |
| 5,364,973 A | 11/1994 | Pazos | 568/620 |
| 5,689,012 A | 11/1997 | Pazos et al. | 568/619 |
| 6,313,060 B1 | 11/2001 | Sugiyama et al. | 502/175 |
| 6,627,576 B1 | 9/2003 | Sugiyama et al. | 502/175 |
| 6,673,972 B1 * | 1/2004 | Ostrowski et al. | 568/620 |
| 6,838,061 B1 | 1/2005 | Berg et al. | |

FOREIGN PATENT DOCUMENTS

| | | |
|---|---|---|
| DE | 203 735 | 11/1983 |
| JP | 46-27250 | 8/1971 |
| JP | 5-247199 A | 9/1993 |
| JP | 6-16806 | 1/1994 |
| JP | 7-165907 | 6/1995 |
| JP | 9-48845 A | 2/1997 |
| WO | WO 90/07537 | 7/1990 |
| WO | WO 00/64963 A | 11/2000 |
| WO | WO 01/10933 | 2/2001 |
| WO | WO 01/62825 A | 8/2001 |
| WO | WO 01/62826 A | 8/2001 |

* cited by examiner

*Primary Examiner*—Rosalynd Keys
(74) *Attorney, Agent, or Firm*—Oblon, Spivak, McClelland, Maier & Neustadt, P.C.

(57) ABSTRACT

A method for precisely producing a polyether having a relatively high molecular weight by means of a double metal cyanide complex catalyst is provided. A method for continuously producing a polyether, which comprises ring opening addition polymerization of an alkylene oxide in the presence of a double metal cyanide complex catalyst, wherein substantially no vapor phase part is present in a reactor.

15 Claims, 4 Drawing Sheets

METHOD FOR CONTINUOUSLY PRODUCING A POLYETHER

TECHNICAL FIELD

The present invention relates to a method for continuously producing a polyether. More particularly, it relates to a method for continuously producing a polyether, which comprises ring opening addition polymerization of an alkylene oxide in the presence of a double metal cyanide complex catalyst.

BACKGROUND ART

Polyethers which are employed as urethane materials are produced by various methods. As the methods, batch methods and continuous methods have been mainly known. The batch methods have such drawbacks as poor volume efficiency of the reaction vessel and long production time. On the other hand, in continuous production methods, the volume efficiency of the reaction vessel tends to be high, and the production time can be relatively shortened, and accordingly various methods have been conventionally proposed. For example, Patent Document 1 (East German Patent DD 203,735), Patent Document 2 (U.S. Pat. No. 5,689,012) and Patent Document 3 (JP-A-6-16806) propose a method for continuously producing a polyether by means of a double metal cyanide complex catalyst. Further, Patent Document 4 (JP-A-7-165907) proposes a method for continuously producing a polyether having a low degree of unsaturation.

Patent Document 1 proposes a method for continuously producing a polyether by means of a double metal cyanide complex catalyst by using a tubular reactor. However, a preliminary operation such as activation of the catalyst is essential, such being troublesome. Further, when a large scale reactor is employed so as to increase the production amount, mixing failure of the reaction liquid is likely to occur, and accordingly the polyether to be obtained tends to contain products having an extremely high molecular weight and have a high viscosity.

Patent Document 2 proposes a method for continuously producing a polyether having a narrow molecular weight distribution by means of a double metal cyanide complex catalyst, by circulating the reaction liquid and continuously charging materials and a catalyst, which is not activated, in the middle of the circulation. However, in this proposal, the pressure as a production condition is not described, and the molecular weight distribution depending upon presence or absence of the vapor phase is not mentioned.

Further, Patent Document 4 proposes a method to suppress the content of monools having an unsaturated bond (hereinafter referred to as unsaturated monool) in the product polyether by contriving combination of production equipment. However, an apparatus to remove unsaturated monools is provided, and thus the production equipment tends to be large scale as a whole.

On the other hand, Patent Document 3 proposes to bring out characteristics of the double metal cyanide complex catalyst by contriving the reaction apparatus. However, consideration of improved technique has been required because of demands for improvement in catalyst performance and precise production of polyethers (production while precisely controlling the molecular weight and the molecular weight distribution of polyethers) in recent years.

Under these circumstances, the present invention is to overcome these problems and to provide a production method capable of precisely producing a polyether, more particularly, it provides a production method for precisely producing a polyether having a relatively high molecular weight by means of a double metal cyanide complex catalyst.

DISCLOSURE OF THE INVENTION

The present invention provides a method for continuously producing a polyether, which comprises ring opening addition polymerization of an alkylene oxide in the presence of a double metal cyanide complex catalyst, wherein substantially no vapor phase part is present in a reactor. Accordingly, a polyether having a narrower molecular weight distribution, as compared with a case where the vapor phase part is present, can be obtained. Further, in the reaction of the ring opening addition polymerization of an alkylene oxide, the reaction pressure is preferably at least the vapor pressure of the alkylene oxide at the reaction temperature. In this embodiment, the method is a production method which prevents vaporization of the alkylene oxide, and in which substantially no vapor phase part is present in the reactor.

Further, it is preferred that the reactor has a mixing part, and the Reynolds number at the mixing part is at least 20. In this embodiment, the method is a stable production method wherein the alkylene oxide is adequately dispersed and dissolved in the reaction liquid. Further, it is preferred that the reactor has a cyclic flow part at least as its part. In this embodiment, the method is a production method having a high stability, since the activated double metal cyanide complex catalyst circulates.

Further, it is preferred that the reactor has an alkylene oxide supply part, and the alkylene oxide supply amount per one alkylene oxide supply part is from 0.001 to 75 mass % based on the entire reaction liquid flow amount at the alkylene oxide supply part. In this embodiment, ring opening addition polymerization of the alkylene oxide can be carried out without inhibiting activation of the double metal cyanide complex catalyst.

EXPLANATION OF NUMERICAL REFERENCES

1, 2, 3, 4: Continuous reactor
5: Multistage stirring and mixing vessel
11: Initiator supply part
12: Alkylene oxide supply part
13: Polyether discharge part
21: Pump
22: Pressure adjusting vessel

BEST MODE FOR CARRYING OUT THE INVENTION

The polyether in the present invention is a generic name for a polyoxyalkylene monool or a polyoxyalkylene polyol produced by ring opening addition polymerization of an alkylene oxide to an initiator in the presence of a double metal cyanide complex catalyst.

The initiator may, for example, be a monohydric alcohol such as methanol or ethanol; a polyhydric alcohol such as ethylene glycol, propylene glycol, 1,4-butanediol, glycerol, trimethylolpropane, pentaerythritol, diglycerol, meso-erythritol, methyl glucoside, glucose, sorbitol or sucrose; an amine such as ethylenediamine, diethylenediamine, triethylenediamine, diaminodiphenylmethane, hexamethylene diamine or propylene diamine; or a condensed compound such as a phenol resin or a novolac resin. Such active hydrogen compounds may be used in combination of two or more of them. Among these active hydrogen compounds, a monohydric or polyhydric alcohol is preferred.

Further, a compound obtained by ring opening addition of an alkylene oxide such as propylene oxide to the above-mentioned initiator, may be used as the initiator, and its hydroxyl value is preferably at most 150 mgKOH/g, more preferably at most 120 mgKOH/g. Among them, an alcohol having a hydroxyl value of at most 150 mgKOH/g, obtained by ring opening addition of an alkylene oxide to a monohydric or polyhydric alcohol, is particularly preferred as the initiator.

The alkylene oxide to be subjected to ring opening addition polymerization to an initiator may, for example, be ethylene oxide, propylene oxide, 1,2-butylene oxide, 2,3-butylene oxide, epichlorohydrin or styrene oxide, and propylene oxide alone or a combination of ethylene oxide and propylene oxide is preferred.

As the double metal cyanide complex, a complex containing zinc hexacyanocobaltate as the main component, is preferred, and its ether and/or alcohol complex is preferred. As the composition, one disclosed in JP-B-46-27250 can be essentially employed.

As the ether, monoethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB) or tripropylene glycol monomethyl ether (TPME) may, for example, be preferred. As the alcohol, tert-butyl alcohol as disclosed in JP-A-4-145123 is preferred. Among them, a zinc hexacyanocobaltate/glyme complex, a zinc hexacyanocobaltate/METB complex, a zinc hexacyanocobaltate/tert-butyl alcohol complex or a zinc hexacyanocobaltate/METB/tert-butyl alcohol complex is particularly preferred.

The above double metal cyanide complex catalyst (hereinafter referred to simply as "DMC catalyst") is preferred in view of the following points. (A) The amount of by-products (monools having an unsaturated bond) is small even in a case where the polyether to be produced has a high molecular weight, and a polyether having a low total degree of unsaturation can be obtained. (B) The molecular weight distribution of the polyether to be obtained is relatively narrow, and a polyether having a high molecular weight and having a low viscosity can be obtained. This is due to such a characteristic of the DMC catalyst that when an alkylene oxide is subjected to ring opening addition polymerization to an initiator having a wide molecular weight distribution, addition to an initiator having a lower molecular weight takes place by priority. In a case where the reactor has a cyclic flow part, the reaction liquid circulates, and the alkylene oxide is to undergo addition reaction simultaneously to polyethers having different molecular weights as described hereinafter, addition reaction takes place only to polyethers having low molecular weights substantially selectively when the DMC catalyst is used. (C) The reaction rate of the ring opening addition polymerization reaction of the alkylene oxide is high, whereby a high production efficiency can be secured, and the residence time (reaction time) in the reactor can be shortened, such being favorable for a continuous production method.

The present invention is a method for continuously producing a polyether by means of the above DMC catalyst, characterized in that substantially no vapor phase part is present in the reactor. In the present invention, "substantially no vapor phase part is present in the reactor" means that no vapor phase part by an inert gas such as nitrogen and/or vaporized alkylene oxide is present, and the reactor is in a liquid-sealed state. It is preferred that no vapor phase part is present particularly in the main reaction site where the ring opening addition polymerization reaction of the alkylene oxide proceeds at a high rate. However, the pressure adjusting vessel intended to adjust the pressure in the reactor is not considered as the reactor, and a vapor phase part may be present.

In the reaction of subjecting the alkylene oxide to ring opening addition polymerization, the reaction pressure is preferably at least the vapor pressure of the alkylene oxide at the reaction temperature. In a case where a number of alkylene oxides are mixed as the alkylene oxide, a component having a higher vapor pressure is considered. Specifically, for example, in the reaction of subjecting propylene oxide to ring opening addition polymerization, in a case where the reaction temperature is set to 120° C., as the vapor pressure of propylene oxide at 120° C. is 1 MPa, it is preferred to carry out the reaction under a pressure of at least 1 MPa. Further, in a case where a mixture of propylene oxide and ethylene oxide is subjected to ring opening addition polymerization, and the reaction temperature is set to 120° C., as the vapor pressure of ethylene oxide at 120° C. is 2 MPa, it is preferred to carry out the reaction under a pressure of at least 2 MPa. The reaction can be carried out while substantially no vapor phase part is present in the reactor by employing the above pressure.

In a case where a vapor phase part is present in the reactor as different from the present invention, when propylene oxide is subjected to the reaction for example, if the reaction is carried out at a reaction temperature of 120° C. under a reaction pressure of 0.5 MPa, the ring opening addition polymerization of propylene oxide takes place in the liquid phase part, and propylene oxide is supplied mainly from the vapor phase part. In this case, there are following problems. Namely, the propylene oxide concentration in the reaction liquid is different between the vapor-liquid interfacial part which is in contact with the vapor phase and the liquid phase part which is not in contact with the vapor phase (which is referred to as the liquid phase deep part), since the polymerization reaction rate of propylene oxide is adequately higher than the diffusion rate of propylene oxide to the reaction liquid. This phenomenon is more remarkable when the polyether has a high viscosity. As a result, there is a difference in the reaction amount of propylene oxide to the initiator between the vapor-liquid interfacial part and the liquid phase deep part, and a polyether having a higher molecular weight is formed at the vapor-liquid interfacial part.

Further, if the reaction liquid is attached to a part at which the vapor phase part is stably present in the reactor, a vapor phase propylene oxide is supplied to the attached reaction liquid, and a polyether having an extremely higher molecular weight than that from the liquid phase is formed independently from the liquid phase part.

As mentioned above, in a case where a DMC catalyst having a high reaction rate is employed, and the vapor phase part is present in the reactor, the molecular weight distribution of the polyether to be obtained tends to be broad. Particularly when the formation amount of polyethers having molecular weights higher than the desired molecular weight increases (in such a state that "having a tail in the high molecular weight side" when the molecular weight distribution is measured), the viscosity of the polyether to be obtained tends to be high. When no vapor phase part is present in the reactor, formation of such polyethers having high molecular weights can be suppressed, and the molecular weight distribution can be precisely controlled.

In the present invention, the reactor is an apparatus for continuously producing a polyether, equipped with a supply part of each of the initiator, the DMC catalyst and the alkylene oxide and a discharge part of the formed polyether (including the DMC catalyst), and capable of adjusting the temperature and the pressure. Here, the reactor may have a number of the respective supply parts, and may have a number of the polyether discharge parts. Here, as the method of supplying the DMC catalyst, it is preferred to supply the catalyst in a state of a slurry having the catalyst dispersed in a dispersing medium.

As a specific method, (a) a method wherein the DMC catalyst is preliminarily dispersed in the initiator, a small amount of the alkylene oxide is added, followed by heating and polymerization, and thus obtained preliminarily activated DMC catalyst dispersion is supplied, (b) a method wherein the DMC catalyst is dispersed in at least one part of the initiator and supplied to the reactor together with the initiator, (c) a method wherein a so-called slurried DMC catalyst which is produced by preliminarily dispersing the DMC catalyst in a small amount of a dispersing medium is supplied, may, for example, be mentioned. The method (b) or (c) is preferred since preparation of the DMC catalyst is simple.

In the present invention, it is preferred that the reactor has a mixing part, and the Reynolds number at the mixing part is at least 20. The mixing part is provided with a purpose of uniformly dispersing the alkylene oxide in the reaction liquid. Namely, it is preferred to provide the mixing part in the vicinity of the alkylene oxide supply part, and it is more preferred to provide the mixing part at the immediately lower course to the alkylene oxide supply part relative to the flow of the reaction liquid, or to provide the alkylene oxide supply part in the middle of the mixing part.

When the alkylene oxide supply part is provided in the vicinity of the mixing part, immediately after the alkylene oxide is supplied to the reaction liquid, it is adequately dispersed and dissolved in the liquid, whereby the alkylene oxide concentration in the reaction liquid becomes uniform, such being preferred. Further, it is preferred that the alkylene oxide is supplied to a reaction liquid in which the DMC catalyst is present, and it is more preferred that it is supplied to a reaction liquid in which an activated DMC catalyst is present.

The mixing part may be either a dynamic mixer or a static mixer or a combination thereof, however, it is preferred to provide a dynamic mixer. Specific examples of the dynamic mixer include stirring and mixing vessels having an agitating blade, and preferred is a multistage stirring and mixing vessel having a multistage agitating blade.

Figure 1:
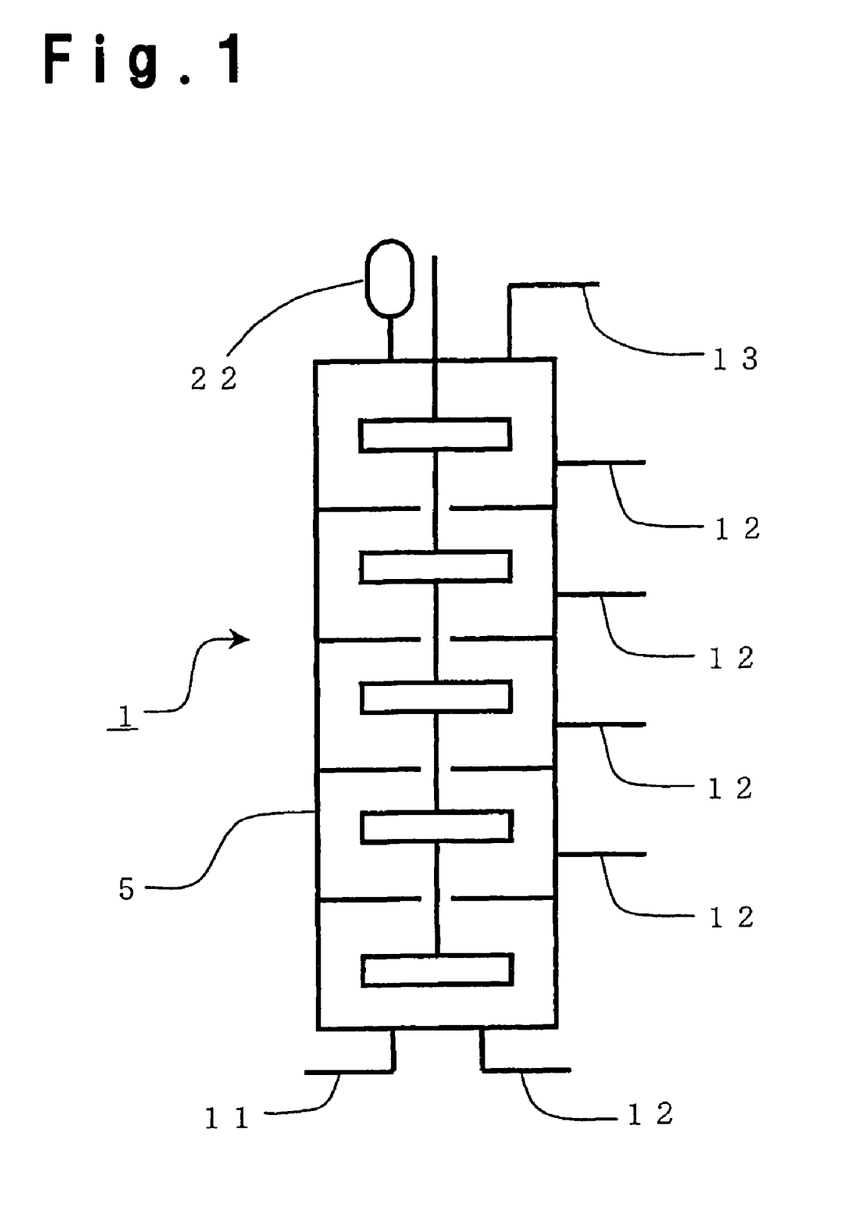
FIG. 1: A schematic view illustrating a reactor comprising a multistage stirring and mixing vessel.

As a specific example of the multistage stirring and mixing vessel, a reactor as shown in FIG. 1 may be mentioned. In FIG. 1, a schematic view illustrating a reactor comprising a multistage stirring and mixing vessel is shown. A continuous reactor 1 comprises a multistage stirring and mixing vessel 5 as a whole, and has an initiator supply part 11, an alkylene oxide supply part 12 and a polyether discharge part 13. Further, a pressure adjusting vessel 22 is attached to the continuous reactor 1, and controls the pressure in the reactor. In the vessel, a number of (five compartments in this Fig.) reaction zones are formed by partition walls, and each reaction zone has an agitating blade which rotates by a shared shaft which runs through holes formed on the respective partition walls.

The agitating blade may, for example, be a paddle blade, a pitched paddle blade, a turbine blade or an anchor blade. The size of the agitating blade is preferably at least 0.5, more preferably at least 0.75, particularly preferably at least 0.8, as the diameter of the agitating blade relative to the diameter of the vessel (d/D). The multistage means at least two, and it is preferably at least five, more preferably at least ten, particularly preferably at least twelve. As the disposition of the above multistage agitating blade, several blades may be provided in one reaction zone or one blade may be provided in one reaction zone to form several reaction zones connected. Further, as specific examples of the static mixer, known products such as a static mixer manufactured by Sulzer and a static mixer manufactured by Noritake Co., Limited may be mentioned.

The Reynolds number at the mixing part is preferably at least 20, more preferably at least 100, furthermore preferably at least 500, particularly preferably at least 2000. The Reynolds number of at least 20 means a state where adequate mixing is carried out. For the calculation of the Reynolds number, a reaction liquid having a highest viscosity at the end of the mixing part is considered. However, this is for convenience, and the practical viscosity at the mixing part is low as compared with the viscosity of the polyether discharged, since low molecular weight products not having desired molecular weight and unreacted alkylene oxide are present, and the Reynolds number tends to be high resultingly. The method for calculating the Reynolds number (Re) may be a commonly employed calculation method, and specifically, the following calculation examples may be mentioned. In a case where a stirring and mixing vessel having an agitating blade is employed as a dynamic mixer, calculation by the following formula (1) is preferred.

$$Re' = d^2 n \rho / \mu \tag{1}$$

wherein Re' is stirring Reynolds number, and may be considered to be the same as the general Reynolds number (Re) in a sense that it is an index showing mixture state. Further, d is the diameter of the agitating blade, n is the rotational speed of the agitating blade, $\rho$ is the liquid specific gravity, and $\mu$ is the liquid viscosity. Further, in a case of a static mixer, calculation by the following formula (2) based on the hollow linear velocity is preferred.

$$Re = Du\rho / \mu \tag{2}$$

wherein D is the flow path representative diameter, u is the hollow linear velocity, $\rho$ is the liquid specific gravity and $\mu$ is the liquid viscosity.

As mentioned above, when the reactor has a mixing part, and the Reynolds number at the mixing part is at least 20, the alkylene oxide is adequately dispersed and dissolved in the reaction liquid, whereby concentration of the alkylene oxide dissolved in the reaction liquid can be made uniform, and production can be carried out stably.

Further, the reactor in the present invention preferably has a cyclic flow part at least as its part. Here, "having the cyclic flow part" means that the reaction liquid can circulate in the cyclic flow part. Namely, the entire reactor may be cyclic, the cyclic flow part may be combined with a linear flow part, or a number of cyclic flow parts may be provided. Further, the cyclic flow part preferably has a pump for circulation. By means of the pump, the reaction liquid in the cyclic flow part is circulated, and the circulation flow amount of the reaction liquid is controlled at the same time. Circulation of the reaction liquid is preferred by reason that, the alkylene oxide is supplied to the part at which the activated DMC catalyst circulates, whereby the production method has a high stability, and the alkylene oxide supply amount can be controlled also by the circulation flow amount, as mentioned hereinafter. Namely, the cyclic flow part preferably has the alkylene oxide supply part in its part, whereby the above advantages can be provided.

Figure 2:
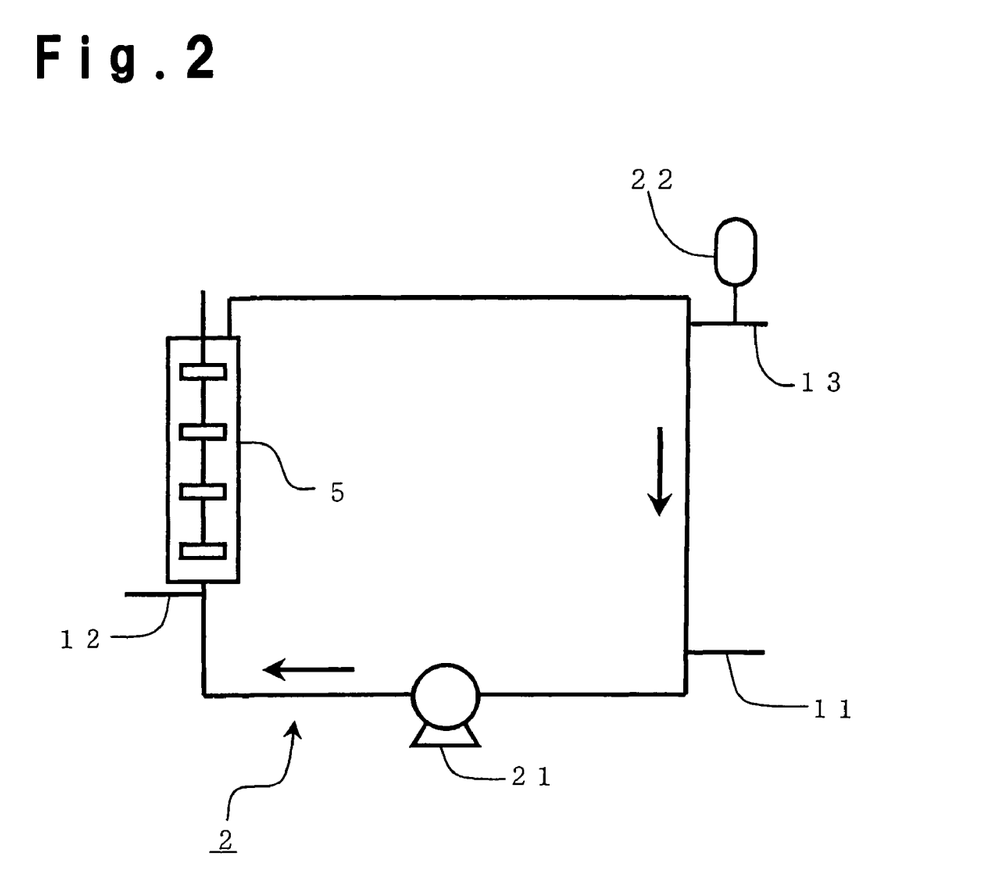
FIG. 2: A schematic view illustrating a reactor having a multistage stirring and mixing vessel in one part of a cyclic flow part.

As a preferred specific example of the above-described reactor, a reactor having a multistage stirring and mixing vessel at a part of the cyclic flow part may be mentioned. Its schematic view is illustrated in FIG. 2. A continuous reactor 2 comprises a cyclic flow part as a whole, has a multistage stirring and mixing vessel 5 in its part, and has an initiator supply part 11, an alkylene oxide supply part 12, a polyether discharge part 13 and a pump 21.

Figure 3:
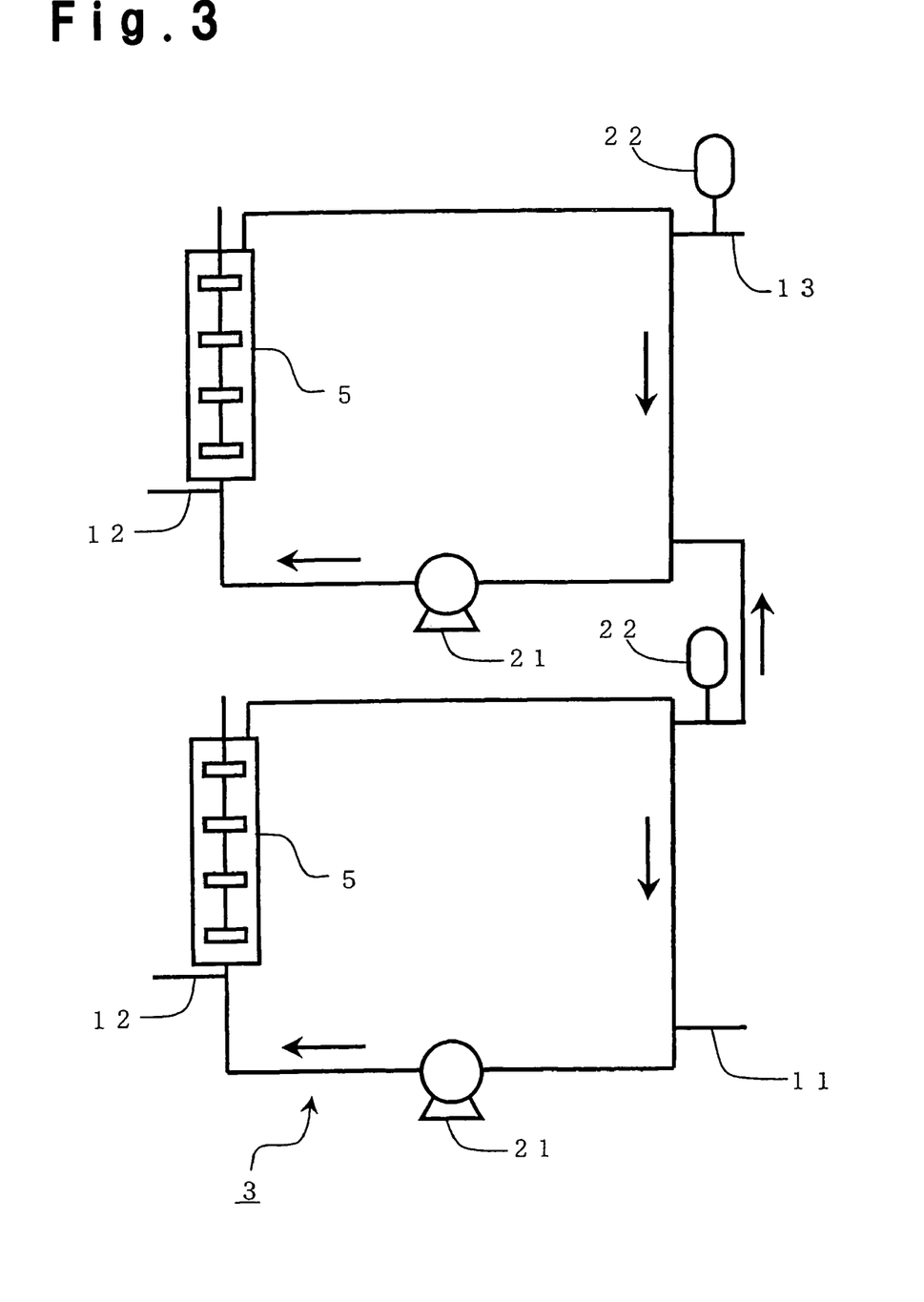
FIG. 3: A schematic view illustrating a reactor having cyclic flow parts connected in a multistage manner.

Further, a pressure adjusting vessel 22 is attached to the continuous reactor 2, and controls the pressure in the reactor. Arrows in Fig. represent the flow direction of e.g. the reaction liquid. The continuous reactor 2 has heat insulating/heating apparatus (not shown) so as to control the temperature at each part. Further, another preferred specific example is shown in FIG. 3. In FIG. 3, a schematic view illustrating a reactor having cyclic flow parts connected in a multistage manner (two stages in this Fig.). A continuous reactor 3 comprises two cyclic flow parts as a whole, and other numerical references are as defined in the explanation for FIG. 2.

Figure 4:
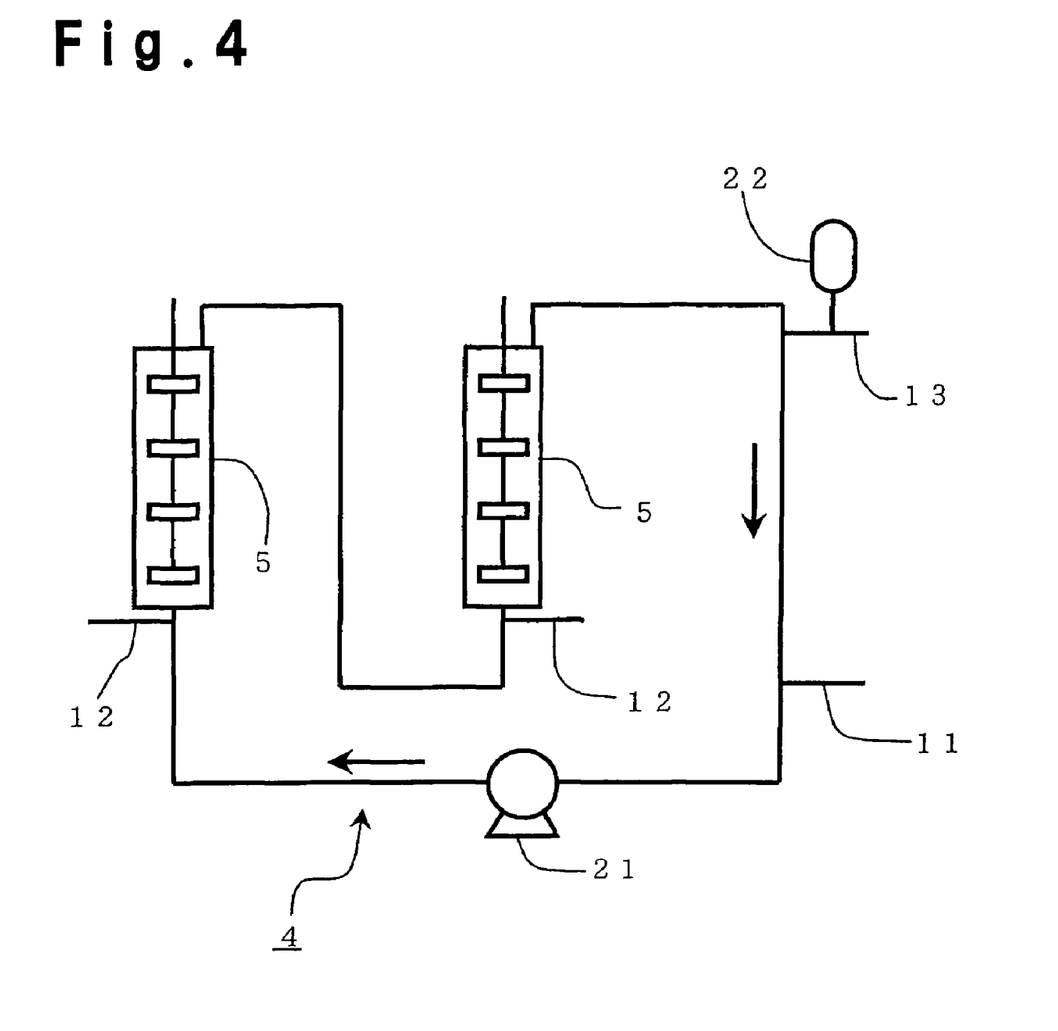
FIG. 4: A schematic view illustrating a reactor having a number of multistage stirring and mixing vessels at a cyclic flow part.

Still further, another preferred specific example is shown in FIG. 4. In FIG. 4, a schematic view illustrating a reactor having a number of (two in this Fig.) multi-stage stirring and mixing vessels in the cyclic flow part. A continuous reactor 4 comprises a cyclic flow part as a whole, and two multistage stirring and mixing vessels are provided continuously. Further, immediately before each of multistage stirring and mixing vessels 5, an alkylene oxide supply part 12 is provided. Other numerical references are as defined in the explanation for FIG. 2.

In the continuous production method of the present invention, the following reaction conditions such as the reaction temperature, the reaction pressure and the alkylene oxide supply amount (supply rate) are also considered. The reaction temperature may be a temperature at which the alkylene oxide is stably polymerized by means of the DMC catalyst, and specifically, it is preferably from 80 to 150° C., more preferably from 90 to 140° C., particularly preferably from 100 to 130° C. The reaction pressure is, as described above, preferably at least the vapor pressure of the alkylene oxide to be reacted at the reaction temperature, and it is more preferably a pressure higher by at least 0.1 MPa than the vapor pressure of the alkylene oxide to be reacted at the reaction temperature. The upper limit of the reaction pressure is a pressure at which the apparatus can be stably operated, and it is preferably at most 5 MPa, more preferably at most 3.5 MPa.

The supply amount of the alkylene oxide is preferably from 0.001 to 75 mass %, more preferably from 0.1 to 60 mass %, furthermore preferably from 1 to 50 mass %, particularly preferably from 1 to 30 mass %, based on the entire reaction liquid flow amount at the alkylene oxide supply part, as the alkylene oxide supply amount per one alkylene oxide supply part.

Here, the reaction liquid flow amount means the total flow amount of the alkylene oxide, the initiator and the DMC catalyst. With respect to the initiator in this case, a polyether having the alkylene oxide added to the original initiator supplied to the reactor is also considered as the initiator. Particularly, as an example of the method for controlling the alkylene oxide supply amount, a case where the alkylene oxide is supplied to the cyclic flow part may be mentioned. Namely, a method may be mentioned wherein the flow amount of the reaction liquid which flows through the alkylene oxide supply part is controlled as the circulation flow amount, and the circulation flow amount and the alkylene oxide supply amount are both controlled.

When the supply amount of the alkylene oxide is within the above range, ring opening addition polymerization of the alkylene oxide can be carried out without preventing activation of the DMC catalyst. Namely, if the alkylene oxide supply amount exceeds 75 mass %, the DMC catalyst which is in contact with the excess alkylene oxide is less likely to be activated, such being unfavorable. Further, if the alkylene oxide supply amount is less than 0.001 mass %, the production rate of the polyether tends to be low, such being unfavorable.

The production amount of the polyether is preferably from 0.001 to 2 kg/s, more preferably from 0.1 to 1 kg/s per 1 m$^3$ of the reactor. Here, the production amount of the polyether is, since production of the present invention is continuous production, the same as the total supply amount of the original initiator, DMC catalyst and alkylene oxide as materials. When the production amount is within the above range, heat generation at the time of reaction of the alkylene oxide tends to be easily controlled. Further, the supply amount of the DMC catalyst is preferably from 0.002 to 0.5 mass %, more preferably from 0.003 to 0.2 mass %, particularly preferably from 0.01 to 0.1 mass %, based on the production amount of the polyether.

The polyether produced by the continuous production method of the present invention has such characteristics that the total degree of unsaturation is low, formation of high molecular weight products relative to the desired molecular weight is suppressed, and the viscosity is low. The total degree of unsaturation is preferably at most 0.04 meq/g, more preferably at most 0.03 meq/g. Further, of the polyether produced by the continuous production method of the present invention, the hydroxyl value is preferably from 5 to 100 mgKOH/g, more preferably from 10 to 80 mgKOH/g.

The polyether produced by the production method of the present invention is suitable as a material for e.g. functional oil, urethane resins, urethane foams and sealants.

EXAMPLES

Now, the present invention will be explained in further detail with reference to Examples, however, the present invention is by no means restricted thereto.

Materials employed in Examples are shown below. DMC catalyst A is a zinc hexacyanocobaltate/METB/tert-butyl alcohol complex catalyst and is in a fine particle form. Example for production of the DMC catalyst is shown in Example 1.

Initiator 1 is polyoxypropylenetriol of 168 mgKOH/g, obtained by ring opening addition polymerization of propylene oxide to glycerol by means of a potassium hydroxide catalyst. The viscosity of the initiator 1 at 25° C. is 270 mPa·s.

Initiator 2 is polyoxypropylenetriol of 56 mgKOH/g, obtained by ring opening addition polymerization of propylene oxide to glycerol by means of a potassium hydroxide catalyst. The viscosity of the initiator 2 at 25° C. is 500 mPa·s.

Further, the molecular weight distribution ($M_w/M_n$) was measured by means of gel permeation chromatography (GPC), and the molecular weight was obtained as calculated as polystyrene. Further, confirmation of presence or absence of the vapor phase part was carried out by the following method. Namely, an observation window was provided in the vicinity of the location at which the vapor phase was considered to be most likely to collect in each reactor, and presence or absence of the vapor phase was judged by visual observation.

Example 1

Into 15 cm$^3$ of an aqueous solution containing 10 g of zinc chloride, 80 cm$^3$ of an aqueous solution containing 4 g of potassium hexacyanocobaltate ($K_3Co(CN)_6$) was dropwise added over a period of 30 minutes while keeping the temperature at 40° C. After completion of the dropwise addition, a mixture comprising 80 cm$^3$ of a mixed liquid of ethylene glycol mono-tert-butyl ether and tert-butyl alcohol (containing 80 mass % of tert-butyl alcohol, hereinafter referred to as TBA mixed liquid) and 80 cm$^3$ of water was added, and the temperature was raised to 60° C. After stirring for 1 hour, a filtration operation was carried out to obtain a cake containing a double metal cyanide complex.

Then, a mixture comprising 40 cm$^3$ of the TBA mixed liquid and 80 cm$^3$ of water was added to the cake containing a double metal cyanide complex, followed by stirring for 30 minutes, and then filtration was carried out. To the cake containing a double metal cyanide complex thus obtained, a mixture comprising 100 cm$^3$ of the TBA mixed liquid and 10 cm$^3$ of water was further added, followed by stirring, and then filtration was carried out. The cake containing a double metal cyanide complex was dried at 80° C. for 4 hours, and pulverized to obtain a zinc hexacyanocobaltate/METB/tert-butyl alcohol complex catalyst (DMC catalyst A).

Example 2

As a continuous reactor, a multistage stirring and mixing vessel made of stainless steel as shown in FIG. 1 was employed. The entire reactor was divided into 10 reaction zones by means of partition walls so that the respective zones had substantially the same volume, and the volume of each reaction zone was about 100 cm$^3$. The outer appearance of the reactor is substantially cylindrical (inner diameter: 6.5 cm), the reactor is disposed so that the entire reactor is vertical, and one double-paddle blade (blade diameter: 5 cm) which shares the shaft at the center is disposed in each reaction zone. The stirrer speed was 900 revolutions/min. The initiator 1 was supplied from the bottom of the reactor, and the reaction liquid was discharged from the top of the reactor. The initiator supply amount was 2 g/min, and the DMC catalyst A was preliminarily dispersed in the initiator 1 in a concentration of 0.05 mass % and supplied together.

Propylene oxide as the alkylene oxide was supplied to the first, third, fifth, seventh and ninth stages from the bottom each at a rate of 1.68 g/min. The reaction temperature was 120° C., and the reaction pressure was 1.5 MPa. A stable reaction liquid was obtained from about 30 minutes after initiation of the production. At this time, no vapor phase part was confirmed at the upper part of the reaction vessel. Further, the discharged reaction liquid contained substantially no unreacted remaining propylene oxide. Further, of the obtained polyether (polyoxypropylenetriol), the hydroxyl value was 33.7 mgKOH/g, the molecular weight distribution was 1.12, the total degree of unsaturation was 0.006 meq/g, the viscosity at 25° C. was 1050 mPa·s, and the viscosity at the reaction temperature was 9.2 mPa·s. The stirring Reynolds number in the stirring and mixing vessel was calculated at 3750.

Example 3

Employing the same reactor as in Example 2, the reaction was carried out under the same conditions as in Example 2 except that the stirrer speed was 300 revolutions/min. At this time, no vapor phase part was confirmed at the upper part of the stirring and mixing vessel. Further, the discharged reaction liquid contained substantially no unreacted remaining propylene oxide. Of the obtained polyether (polyoxypropylenetriol), the hydroxyl value was 34.0 mgKOH/g, the molecular weight distribution was 1.16, the total degree of unsaturation was 0.006 meq/g, the viscosity at 25° C. was 1100 mPa·s, and the viscosity at the reaction temperature was 10.0 mPa·s.

Example 4

As a continuous reactor, a cyclic reactor equipped with a stirring and mixing vessel made of stainless steel as shown in FIG. 2 was employed. The total volume of the reactor was about 500 cm$^3$, and the volume of the stirring and mixing vessel part was about 100 cm$^3$. As another part, a pipe having an inner diameter of about 7.5 mm was connected. The stirring and mixing vessel (inner diameter: 4 cm) has four double-paddle blades (blade diameter: 3.2 cm) which share the shaft, and no partition wall is provided.

However, protrusions corresponding to baffle plates were provided on the wall. The stirrer speed was 800 revolutions/min. An alkylene oxide supply part was provided in the vicinity of the inlet of the stirring and mixing vessel (the inlet was set to the bottom), a discharge part was provided at the lower course of the cyclic flow part by about a quarter circuit, an initiator supply part was provided at further lower course by about a quarter circuit, and a circulation pump was provided at further lower course by about a quarter circuit.

The initiator 1 having 0.025 mass % of the DMC catalyst A dispersed therein was supplied from the initiator supply part at 2 g/min, propylene oxide was supplied from the alkylene oxide supply part at 8.4 g/min, and the circulation flow amount was 100 g/min. The reaction temperature was 120° C., and the reaction pressure was 1.2 MPa. A stable reaction liquid was obtained from about 40 minutes after initiation of the production. At this time, no vapor phase part was confirmed at the upper part of the stirring and mixing vessel.

Further, the discharged reaction liquid contained substantially no unreacted remaining propylene oxide. Of the obtained polyether (polyoxypropylenetriol), the hydroxyl value was 33.9 mgKOH/g, the molecular weight distribution was 1.11, the total degree of unsaturation was 0.021 meq/g, the viscosity at 25° C. was 1010 mPa·s, and the viscosity at the reaction temperature was 9.0 mPa·s.

Example 5

Employing the same reactor as in Example 4, the reaction was carried out under the same conditions as in Example 4 except that the circulation flow amount was 200 g/min. At this time, no vapor phase part was confirmed at the upper part of the stirring and mixing vessel. Further, the discharged reaction liquid contained substantially no unreacted remaining propylene oxide. Of the obtained polyether (polyoxypropylenetriol), the hydroxyl value was 34.1 mgKOH/g, the molecular distribution was 1.10, the total degree of unsaturation was 0.006 meq/g, the viscosity at 25° C. was 1080 mPa·s and the viscosity at the reaction temperature was 9.9 mPa·s.

Example 6

As a continuous reactor, a cyclic reactor equipped with a stirring and mixing vessel made of stainless steel as shown in FIG. 3 was employed. This reactor comprises two cyclic reactors employed in Example 4 connected in series. The total volume of the reactor was about 1000 cm$^3$, and the others are substantially the same as in Example 4. The initiator 1 having 0.05 mass % of the DMC catalyst A dispersed therein was supplied from the initiator supply part at 2 g/min, propylene oxide was supplied from the first-stage alkylene oxide supply part at 8.4 g/min, propylene oxide was supplied from the second-stage alkylene oxide supply part at 10.6 g/min, and the circulation flow amount was 100 g/min in each of the first and second stages. The reaction temperature was 120° C., and the reaction pressure was 1.2 MPa. A stable reaction liquid was obtained from about 60 minutes after initiation of the production. At this time, no vapor phase part was confirmed at the upper part of each of the stirring and mixing vessels.

Further, the discharged reaction liquid contained substantially no unreacted remaining propylene oxide. Of the obtained polyether (polyoxypropylenetriol), the hydroxyl value was 16.9 mgKOH/g, the molecular weight distribution was 1.22, the total degree of unsaturation was 0.005 meq/g, the viscosity at 25° C. was 3050 mPa·s, and the viscosity at the reaction temperature was 80 mPa·s.

Example 7

Employing the same reactor as in Example 2, the reaction was carried out under the same conditions as in Example 2 except for the following points alone. With respect to changes, the initiator 2 was used instead of the initiator 1, the initiator supply amount was 4 g/min, the dispersion concentration of the DMC catalyst A in the initiator 2 was 0.025 mass %, and the propylene oxide was supplied to first, third, fifth, seventh and ninth stages from the bottom each at a rate of 1.91 g/min. A stable reaction liquid was obtained from about 20 minutes after initiation of the production. At this time, no vapor phase part was confirmed at the upper part of the reaction vessel. Further, the discharged reaction liquid contained substantially no unreacted remaining propylene oxide. Of the obtained polyether (polyoxypropylenetriol), the hydroxyl value was 17.1 mgKOH/g, the molecular weight distribution was 1.19, the total degree of unsaturation was 0.012 meq/g, the viscosity at 25° C. was 3100 mPa·s, and the viscosity at the reaction temperature was 88 mPa·s.

Example 8

Employing the same reactor as in Example 4, the reaction was carried out under the same conditions as in Example 4 except for the following points alone. With respect to changes, the initiator 2 was used instead of the initiator 1, the initiator supply amount was 3 g/min, the dispersion concentration of the DMC catalyst A in the initiator 2 was 0.025 mass %, and the propylene oxide supply rate was 7.4 g/min. A stable reaction liquid was obtained from about 40 minutes after initiation of the production. At this time, no vapor phase part was confirmed at the upper part of the stirring and mixing action vessel.

Further, the discharged reaction liquid contained substantially no unreacted remaining propylene oxide. Of the obtained polyether (polyoxypropylenetriol), the hydroxyl value was 17.0 mgKOH/g, the molecular weight distribution was 1.28, the total degree of unsaturation was 0.012 meq/g, the viscosity at 25° C. was 3150 mPa·s, and the viscosity at the reaction temperature was 90 mPa·s.

Example 9

Using the same reactor as in Example 6, the reaction was carried out under the same conditions as in Example 6 except for the following points alone. With respect to the changes, the initiator 2 was used instead of the initiator 1, the initiator supply amount was 3 g/min, the dispersion concentration of the DMC catalyst A in the initiator 2 was 0.025 mass %, the supply rate of propylene oxide to the first stage was 7.4 g/min, and the supply rate of propylene oxide to the second stage was 5.3 g/min. A stable reaction liquid was obtained from about 60 minutes after initiation of the production. At this time, no vapor phase part was confirmed at the upper part of the stirring and mixing vessel.

Further, the discharged reaction liquid contained substantially no unreacted remaining propylene oxide. Of the obtained polyether (polyoxypropylenetriol), the hydroxyl value was 11.5 mgKOH/g, the molecular weight distribution was 1.30, the total degree of unsaturation was 0.014 meq/g, the viscosity at 25° C. was 9200 mPa·s, and the viscosity at the reaction temperature was 180 mPa·s.

Example 10

Using the same reactor as in Example 8, the reaction was carried out under the same conditions as in Example 8 except for the following points alone. With respect to the changes, a propylene oxide/ethylene oxide mixture (mixture ratio: 95/5 by mass ratio) was used as the alkylene oxide, the supply rate of the propylene oxide/ethylene oxide mixture was 7.4 g/min, and the reaction pressure was 2.5 MPa. The stable reaction liquid was obtained from about 40 minutes after initiation of the production. At this time, no vapor phase part was confirmed at the upper part of the stirring and mixing vessel.

Further, the discharged reaction liquid contained substantially no unreacted remaining propylene oxide or remaining ethylene oxide. Of the obtained polyether (polyoxypropylenepolyoxyethylenetriol), the hydroxyl value was 17.5 mgKOH/g, the molecular weight distribution was 1.30, the total degree of unsaturation was 0.012 meq/g, the viscosity at 25° C. was 3200 mPa·s, and the viscosity at the reaction temperature was 98 mPa·s.

Example 11

Employing the same reactor as in Example 2, the reaction was carried out under the same conditions as in Example 2 except for the following point alone. The only change was that the reaction pressure was 0.5 MPa. No stable reaction liquid was obtained even about 2 hours after initiation of the production, and a vapor phase part was always confirmed at the upper part of the reaction vessel.

Further, the discharged reaction liquid contained unreacted remaining propylene oxide. Of the obtained polyether (polyoxypropylenetriol), the hydroxyl value was 34.3 mgKOH/g, the molecular weight distribution was 2.15, the total degree of unsaturation was 0.008 meq/g, the viscosity at 25° C. was 2300 mPa·s, and the viscosity at the reaction temperature was 60 mPa·s.

Example 12

Employing the same reactor as in Example 4, the reaction was carried out under the same conditions as in Example 4 except for the following point alone. The only change was that the reaction pressure was 0.5 MPa. No stable reaction liquid was obtained even about 2 hours after initiation of the production, and a vapor phase part was always confirmed at the upper part of the stirring and mixing vessel. Further, the discharged reaction liquid contained unreacted remaining propylene oxide. Of the obtained polyether (polyoxypropylenetriol), the hydroxyl value was 34.1 mgKOH/g, the molecular weight distribution was 2.64, the total degree of unsaturation was 0.008 meq/g, the viscosity at 25° C. was 2800 mPa·s, and the viscosity at the reaction temperature was 85 mPa·s.

INDUSTRIAL APPLICABILITY

It is an object of the continuous production method of the present invention to control the main reaction site for ring opening addition polymerization of an alkylene oxide so that it is not in a non-uniform phase state, that is, the reaction site is not separate into two phases of vapor and liquid, preferably it is in a completely mixed uniform liquid phase. By employing such reaction conditions, a polyether having such characteristics that the total degree of unsaturation is low, formation of high molecular weight products relative to the desired molecular weight is suppressed, the molecular weight distribution is narrow, and the viscosity is low, can be produced.

The entire disclosure of Japanese Patent Application No. 2002-012761 filed on Jan. 22, 2002 including specification, claims, drawings and summary is incorporated herein by reference in its entirety.

What is claimed is:

1. A method for continuously producing a polyether, which comprises ring opening addition polymerization of an alkylene oxide in the presence of a double metal cyanide complex catalyst, wherein substantially no vapor phase part is present in a reactor.

2. The method for continuously producing a polyether according to claim 1, wherein in the ring opening addition polymerization of an alkylene oxide, the reaction pressure is at least the vapor pressure of the alkylene oxide at the reaction temperature.

3. The method for continuously producing a polyether according to claim 1, wherein the reactor has a mixing part, and the Reynolds number at the mixing part is at least 20.

4. The method for continuously producing a polyether according to claim 1, wherein the reactor has a cyclic flow part at least as its part.

5. The method for continuously producing a polyether according to claim 1, wherein the reactor has an alkylene oxide supply part, and the alkylene oxide supply amount per one alkylene oxide supply part is from 0.001 to 75 mass % based on the entire reaction liquid flow amount at the alkylene oxide supply part.

6. The method for continuously producing a polyether according to claim 1, wherein the polyether is produced by ring opening addition polymerization of an alkylene oxide to an initiator in the presence of a double metal cyanide complex catalyst.

7. The method for continuously producing a polyether according to claim 6, wherein the initiator is at least one selected from the group consisting of a monohydric alcohol, a polyhydric alcohol, an amine, a phenol resin and a novolak resin.

8. The method for continuously producing a polyether according to claim 6, wherein a compound obtained by ring opening addition of an alkylene oxide is used as the initiator.

9. The method for continuously producing a polyether according to claim 8, wherein the hydroxyl value of the compound obtained by ring opening addition of an alkylene oxide is at most 150 mg/KOH/g.

10. The method for continuously producing a polyether according to claim 8, wherein the alkylene oxide is at least one selected from the group consisting of ethylene oxide, propylene oxide, 1,2-butylene oxide, 2,3-butylene oxide, epichlorohydrin and styrene oxide.

11. The method for continuously producing a polyether according to claim 1, wherein the double metal cyanide complex catalyst is at least one selected from the group consisting of zinc hexacyanocobaltate/glyme complex, zinc hexacyanocobaltate/METB complex, zinc hexacyanocobaltate/tert-butyl alcohol complex and zinc hexacyanocobaltate/METB/tert-butyl alcohol complex.

12. The method for continuously producing a polyether according to claim 1, wherein the reactor has a mixing part and the Reynolds number at the mixing part is at least 100.

13. The method for continuously producing a polyether according to claim 1, wherein the reactor has a mixing part and the Reynolds number at the mixing part is at least 500.

14. The method for continuously producing a polyether according to claim 1, wherein the reactor has a mixing part and the Reynolds number at the mixing part is at least 2000.

15. A method for continuously producing a polyether according to claim 1, wherein the method utilizes a continuous reactor comprising a cyclic flow part, at least one multistage stirring and mixing vessel part, an initiator supply part, an alkylene oxide supply part and a polyether discharge part.

* * * * *